United States Patent [19]
Hashizawa et al.

[11] Patent Number: 5,674,086
[45] Date of Patent: *Oct. 7, 1997

[54] ELECTRICAL CONNECTOR

[75] Inventors: Shigemi Hashizawa; Shigemitsu Inaba; Toshiaki Hasegawa, all of Shizuoka, Japan

[73] Assignee: Yazaki Corporation, Tokyo, Japan

[*] Notice: The portion of the term of this patent subsequent to Sep. 27, 2011, has been disclaimed.

[21] Appl. No.: 165,827

[22] Filed: Dec. 14, 1993

[30] Foreign Application Priority Data

Dec. 18, 1992 [JP] Japan .................................. 4-338738
May 12, 1993 [JP] Japan .................................. 5-110186

[51] Int. Cl.⁶ ........................................................ H01R 13/62
[52] U.S. Cl. ............................... 439/310; 439/352; 439/372
[58] Field of Search ................................. 439/32, 48, 135, 439/136, 142, 310, 352, 353, 357, 358, 372

[56] References Cited

U.S. PATENT DOCUMENTS

| | | | |
|---|---|---|---|
| 3,111,355 | 11/1963 | Samburoff et al. | 439/310 |
| 3,529,276 | 9/1970 | Hennessey, Jr. | 439/310 |
| 4,658,212 | 4/1987 | Ozawa et al. | 439/310 |
| 4,952,160 | 8/1990 | Olsen | 439/142 |
| 5,350,312 | 9/1994 | Kuno et al. | 439/310 |

FOREIGN PATENT DOCUMENTS

| | | |
|---|---|---|
| 5095790 | 7/1975 | Japan . |
| 60-24539 | 6/1985 | Japan . |
| 1003616 | 9/1965 | United Kingdom . |
| 1317955 | 5/1973 | United Kingdom . |

*Primary Examiner*—Daniel W. Howell
*Assistant Examiner*—Hien D. Vu
*Attorney, Agent, or Firm*—Armstrong, Westerman, Hattori, McLeland & Naughton

[57] ABSTRACT

An electrical connector comprises a feeding connector half and a receiving connector half, wherein the feeding connector half comprising: a case; a connector main body slidably accommodated in a front half portion of the case for accommodating a plurality of terminals; a handle attached to a rear half portion of the case; a slider for causing the connector main body in the case to slide; a rotatable lever of which intermediate portion is supported in the case, a working portion of the lever rotatably attached to the handle and an operating portion of the lever projecting out of the case; a locking means for locking the lever at a portion where the connector main body is locked to a connector main body of the receiving connector half due to a rotation of the rotatable lever; and a means for unlocking the lever.

6 Claims, 13 Drawing Sheets

5,674,086

ELECTRICAL CONNECTOR

BACKGROUND OF THE INVENTION

1. Field of the Invention

The present invention relates to an electrical connector used for charging an automobile in which incomplete connection between a feeding connector half and a receiving connector half is prevented and the connection work of both connector halves can be easily carried out with small insertion force.

2. Description of the Prior Art

FIGS. 15 and 16 show a conventional electrical connector which is disclosed in Japanese Patent Application Laid-open Showa 50-95790.

The electrical connector comprises a female connector half 71 (a receiving connector half), which is fixed to a vehicle body or the like, and a male connector half 72 (a feeding connector half), which is attached to a feeding equipment. In the electrical connector, a hood 75 of the female connector 71 is inserted into a gap between a housing main body 73 of the male connector 72 and a coupling nut 74 mounted on an outer periphery of the housing main body 73, and a stud 76 on an inner wall of the coupling nut 74 is forced to proceed into a spiral channel 77 while rotating the coupling nut 74 to connect the male connector half 72 to the female connector half 71. That is, the conventional connector adopts a so-called bayonet-lock method. A concave portion 77a is formed at an end of the spiral channel 77 and the stud 76 is engaged with the concave portion 77a to lock such connectors to each other in a complete connection of the both connector halves. In the figures, numeral 78 show male terminals, 79 female terminals, 80 a spring, and 81 a gasket. The spring 80 urges the housing main body 73 to the female connector half 71.

With the bayonet-locking type feeding connector, when the female and male connector halves 71 and 72 are engaged with each other, there is a fear of stopping the rotation of the coupling nut 74 before completely locking the connector halves 71 and 72. Further, it is difficult to check at a glance whether the locking is complete or not. The coupling nut 74 is rotated so as to be fastened, which causes the work to be worrisome and the worker's hands will ache from the work. Further, in a multi-pole connector with increased number of terminals accommodated in the female and male connector halves, considerably large force is required to connect the connector halves 71 and 72 to each other and it is difficult for the bayonet-locking type connector to carry out the looking operation with reduced insertion force.

The present invention has been accomplished to eliminate the drawbacks of the conventional electrical connector described above and the object thereof is to provide an electrical connector for charging an automobile with reduced insertion force in which the incomplete locking of the connector halves is securely prevented; the operation efficiency of the locking is improved; and the connection or disconnection between the connector halves are carried out with an one-touch operation.

SUMMARY OF THE INVENTION

The present invention has been accomplished to eliminate the drawbacks described above, and the object thereof is to provide an electrical connector in which the connection work of connector halves is carried out with ease, the interior of the connector halves is simplified to provide a multi-pole connector, and the disconnection between the both connector halves during the charging is securely prevented.

Another object of the present invention is to provide electrical connector in which a lever, which is used for engaging a main body of a feeding connector half with a mated connector half, can be rotated only when the feeding connector half is preliminarily locked to the receiving connector half. This prevents the lever from accidentally rotating.

An electrical connector according to the present invention comprises a feeding connector half and a receiving connector half, wherein the feeding connector half comprises a case; a connector main body slidably accommodated in a front half portion of the case for accommodating a plurality of terminals; a handle attached to a rear half portion of the case; a slider for causing the connector main body in the case to slide; a rotatable lever of which intermediate portion is supported in the case, a working portion of the lever rotatably attached to the handle and an operating portion of the lever projecting out of the case; a locking means for locking the lever at a portion where the connector main body is locked to a connector main body of the receiving connector half due to a rotation of the rotatable lever; and a means for unlocking the lever.

BRIEF DESCRIPTION OF THE DRAWINGS

The present invention will be more apparent from the following description taken with reference to the accompanying drawing wherein.

DETAILED DESCRIPTION OF PREFERRED EMBODIMENTS

Figure 1:
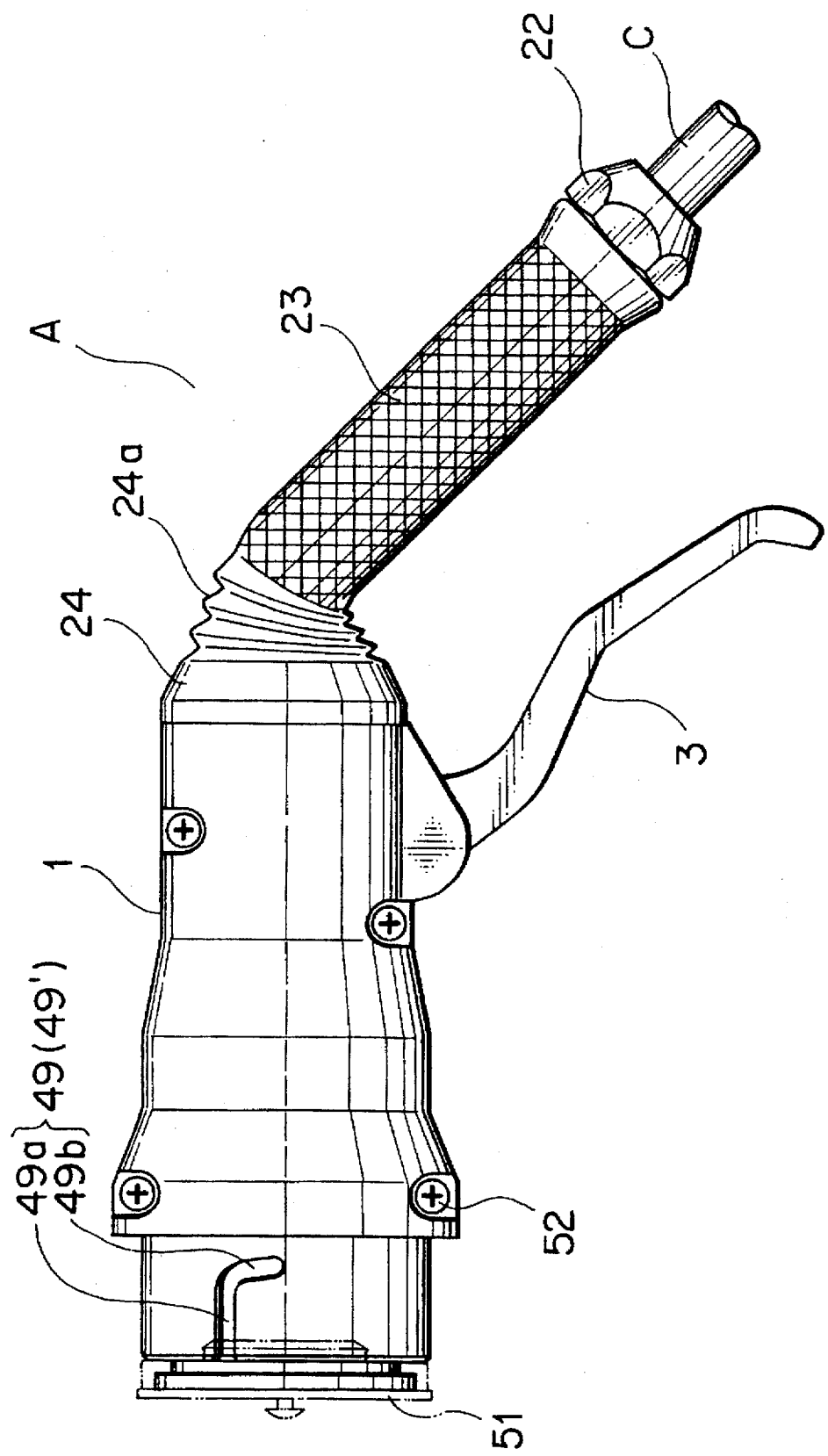
FIG. 1 is a front view of a feeding connector half A of an electrical connector according to a first embodiment of the present invention.
Figure 2:
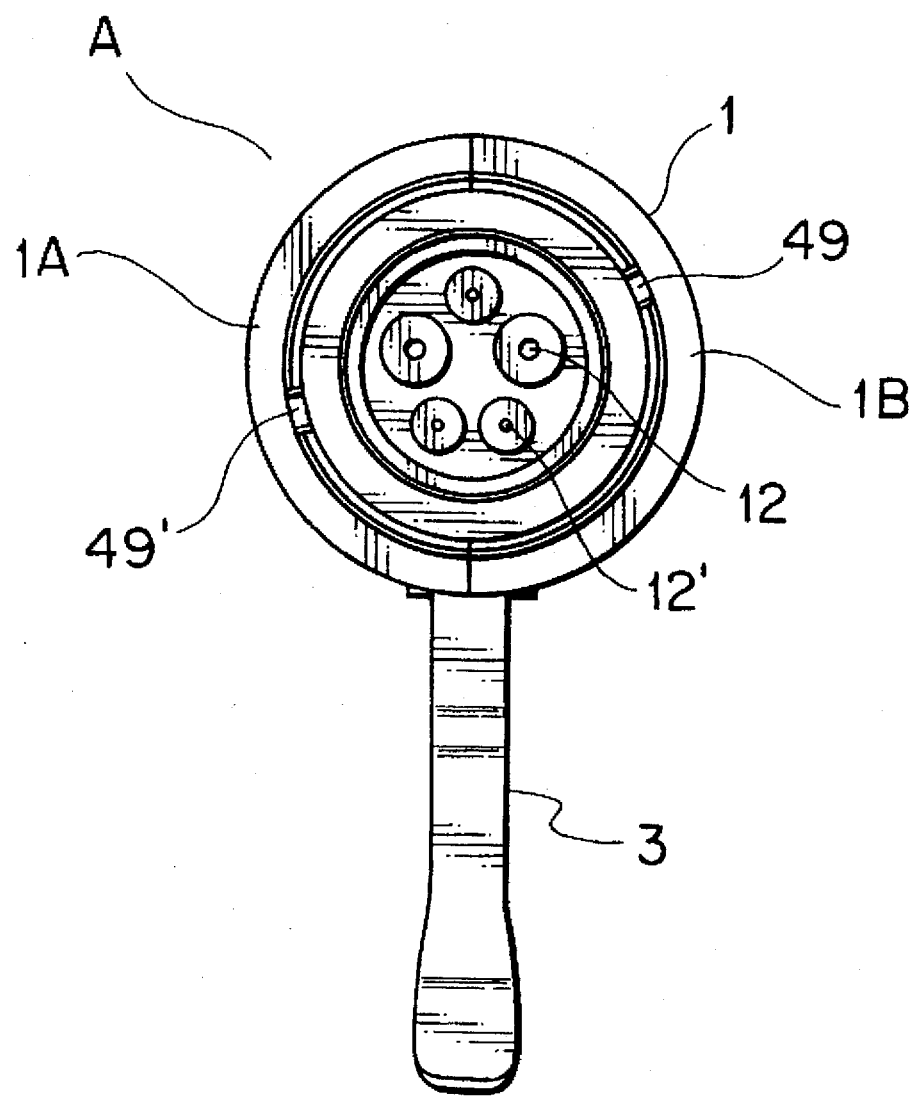
FIG. 2 is a left-side view of the electrical connector in FIG. 1.

An electrical connector according to the first embodiment of the present invention comprises a feeding connector half A attached to a feeding equipment, not shown, and a receiving connector half B fixed to a vehicle body, or the like, as illustrated in FIGS. 1 to 4.

In the feeding connector A, reference numeral 1 shows a case consisting of a pair of split cases 1A and 1B which oppose to each other. A connector main body 2 is slidably mounted to a front half of the case 1, and a handle 4 is movably attached to a rear half of the case 1 for sliding the connector main body 2 in case 1 body by rotating a lever 3. A cable C extending from the feeding equipment, not shown, is introduced into a rear end of the handle 4.

The case 1 is provided with a ring channel 5 on an front inner wall thereof, and a collar 6 is engaged with the ring channel 5. A partition wall 8 is disposed in the case 1 in the middle thereof to provide the connector main body accommodating portion 7. The connector main body 2, with a flange 9 at a rear end thereof, is slidably mounted between the partition wall 8 and the collar 6, and a compression coil spring 10 is disposed between the collar 6 and the flange 9 to urge the connector main body 2 toward the handle 4.

The connector main body 2 is provided with a plurality of terminal accommodating cavities 11 therein. Female terminals 12 and 12' are accommodated in and fixed to the terminal accommodating cavities 11, and a rear holder 13 doubly prevent the female terminals 12 and 12' from being slipped off. Lead wires 14 are connected to a rear half portion of the female connectors 12 and 12' by a known means such as solderless connection, and water-proof rubber plugs 15 are attached to the lead wires 14 to seal the terminals each, which prevents short circuit between the terminals.

A lever mounting portion 17 and an intermediate locking bar portion 18 are formed in the case 1 through a second partition wall 16. A front half of the handle 4, which is inserted into the opening 19 at a rear end of the case 1, penetrates the partition wall 16 and extends from a drilled hole 8a of the partition wall 8 to the inside of a connector main body accommodating portion 7 so as to be connected to the connector main body 2 through a connector pressing plate 20.

The handle 4 has a shape of a pipe and also functions as a through hole for the lead wires 14 of a cable C, which are connected to the female terminals 12. The handle 4 consists of a slider 4a at a front half and a main body 4b at a rear half. The slider 4a at the front half of the handle 4 is slidably supported by the drilled hole 8a of the partition wall 8 and the opening 19. The main body 4b at the rear half of the handle 4 is dog-legged and a fastening nut 22 is attached to an end of the rear half of the handle 4 through a cable fixing packing 21. Numeral 23 shows a grip made of resilient material such as synthetic rubber, and a waterproof cap 24 is integrally formed with the grip 23 at an end thereof by way of bellows 24a. The cap 24 is fixed to the ring channel 25 at the rear end of the case 1.

Figure 3:
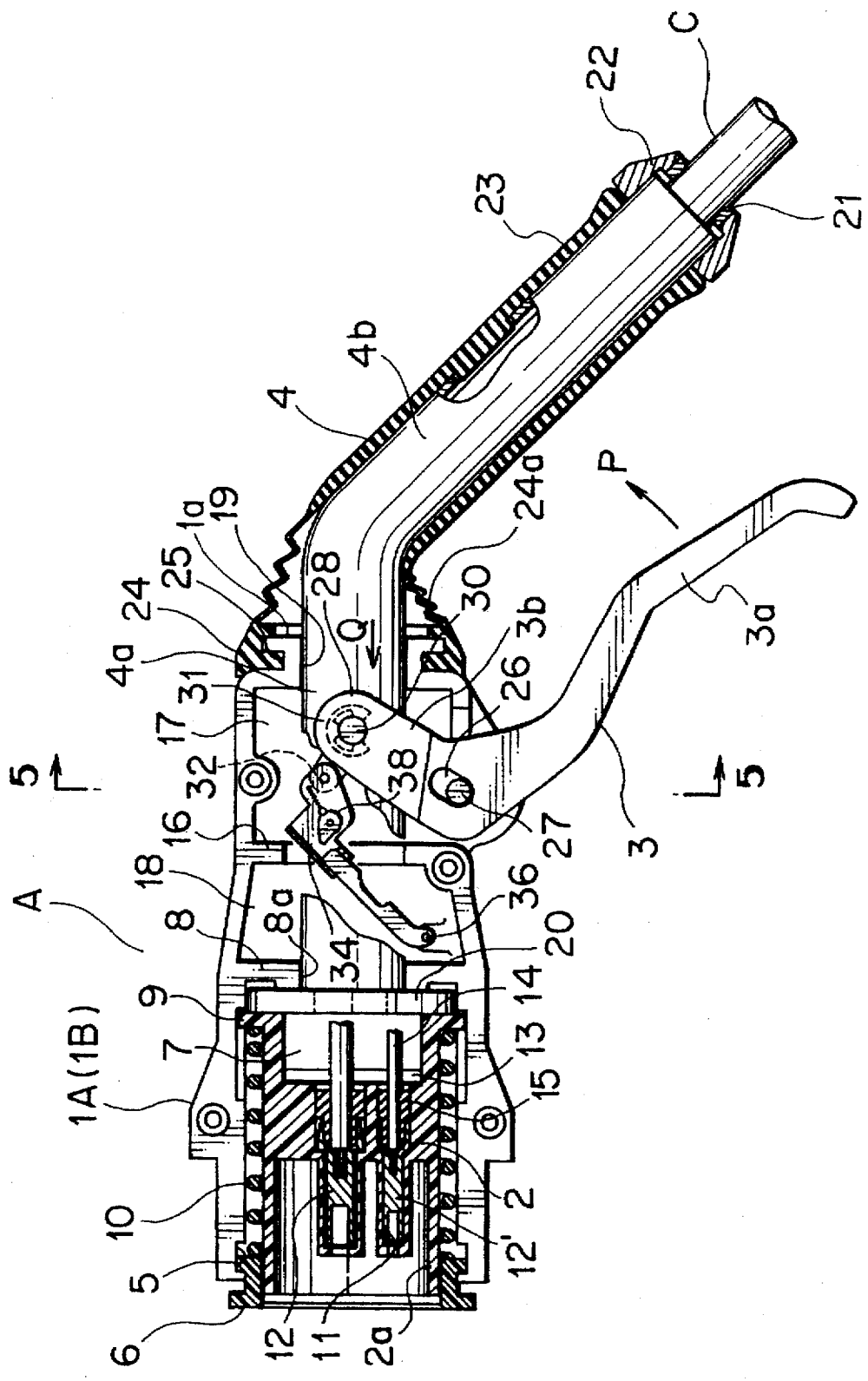
FIG. 3 is a longitudinally cross-sectional view of the electrical connector in FIG. 1.
Figure 5:
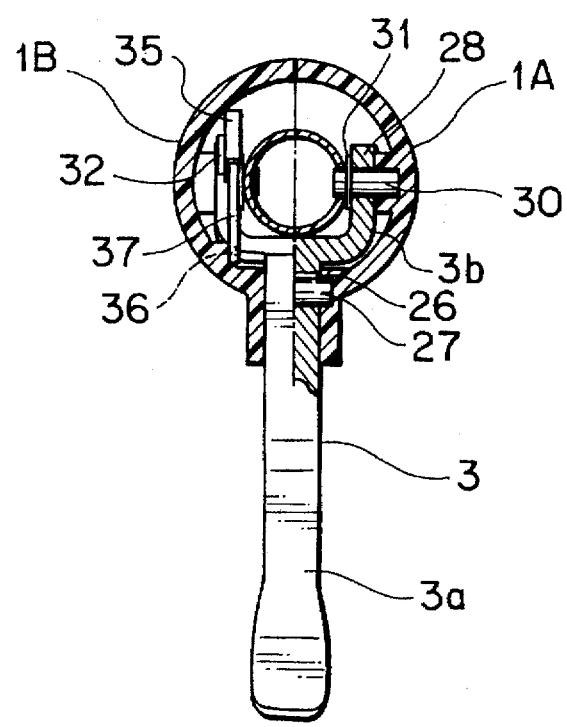
FIG. 5 is a cross-sectional view taken along the line X—X in FIG. 3.
Figure 6:
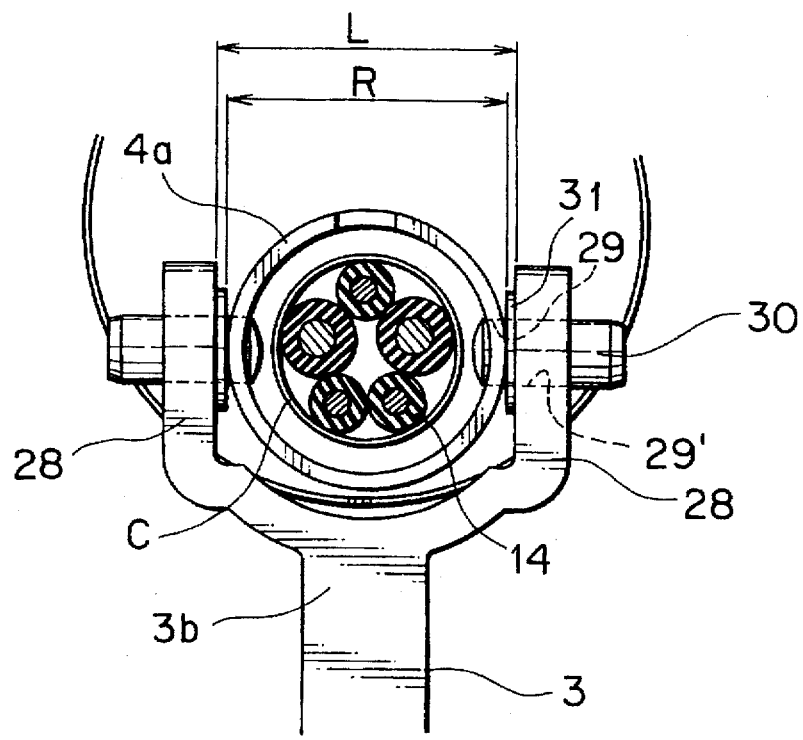
FIG. 6 is a primarily enlarged cross-sectional view of the construction shown in FIG. 5.
Figure 7:
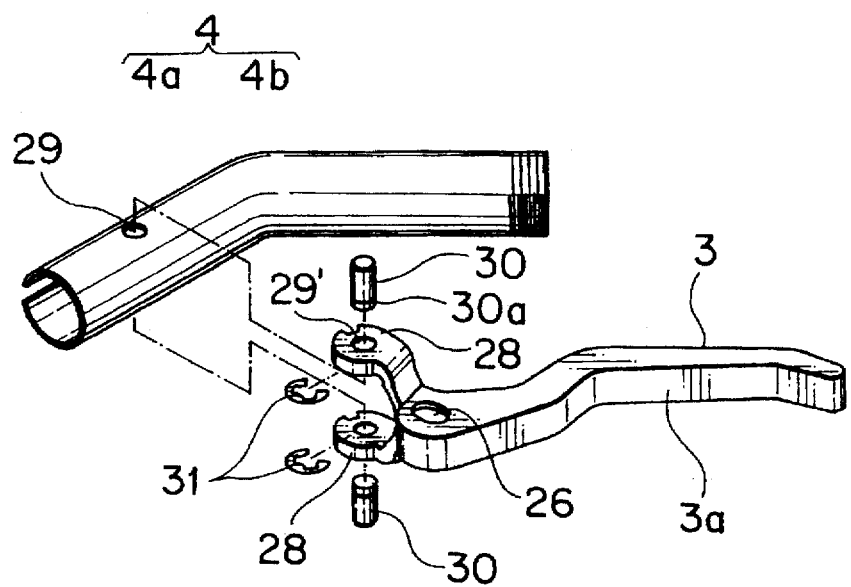
FIG. 7 is an exploded perspective view of a lever 3 and a handle 4.

FIG. 5 is a cross-sectional view illustrating the construction of the lever 3 and the handle 4 which are taken along a X—X line in FIG. 3, and FIG. 6 is a partially enlarged view of the construction shown in FIG. 5. FIG. 7 is an exploded perspective view of the lever and the handle.

As illustrated in FIGS. 5 to 7, the lever is provided with two forked supporting pieces 28, 28 at an end thereof, and the handle is rotatably supported in such a manner that the slider 4a of the pipe-shaped handle 4 is put between the forked pieces 28.

The lever 3 is formed to be doglegged, FIG. 3, with a long operating portion 3a and a short working portion 3b. The working portion 3b is provided with a slotted hole 26 at a crossing portion thereof and is rotatably supported at the lever mounting portion 17 in the cases 1A and 1B by a pin 27 on a lower portion thereof. Two supporting pieces 28, 28 forming a forked portion are attached to an end of the working portion 3b.

The interior width L between supporting pieces 28, 28 forming the forked portion is formed to be slightly larger than the outer diameter of the slider 4a of the handle 4, and shaft holes 29' are mounted in accordance with a pair of shaft holes 29. The slider 4a is placed in the forked portion and the shaft holes 29 and 29' are aligned to insert pins 30, 30 from opposite sides. And which support lever 3. A tip of the pin 30 adjacent slider 4a is provided with a narrow channel 30a disposed in such a manner as to be positioned at a gap between an outer periphery of the slider 4a and the supporting pieces. A stop ring 31 is inserted to engaged with the narrow channel 30a.

The pin 30 is inserted between the lever 3 and the slider 4a through the stop ring 31 and is not axially movable to the right and to the left. An inner end of the pin 30 is engaged with the shaft hole 29 of the slider 4a and an outer end of the pin 30 passes through the shaft hole 29' of the lever 3 and fix lever 3. An outwardly projecting portions of the pins 30 are positioned between channels, not shown, in cases 1A and 1B and works as guide projections so that the slider 4a slides in parallel to the channels of the cases 1A and 1B.

Further, the slotted hole 26 of the lever 3, attached to the cases 1A and 1B with pins 27, permits slider 4a to move in the cases 1A and 1B in parallel to the cases. Thus the rotation center of the lever 3 is longitudinally shifted. Hence, the slotted hole 26 provides relief in the longitudinal direction.

One of the supporting pieces 28 of the lever 3 is provided with an ear-shaped piece 32, FIG. 3, rotatably attached to a locking plate 34 through a pin 33.

Figure 8A:
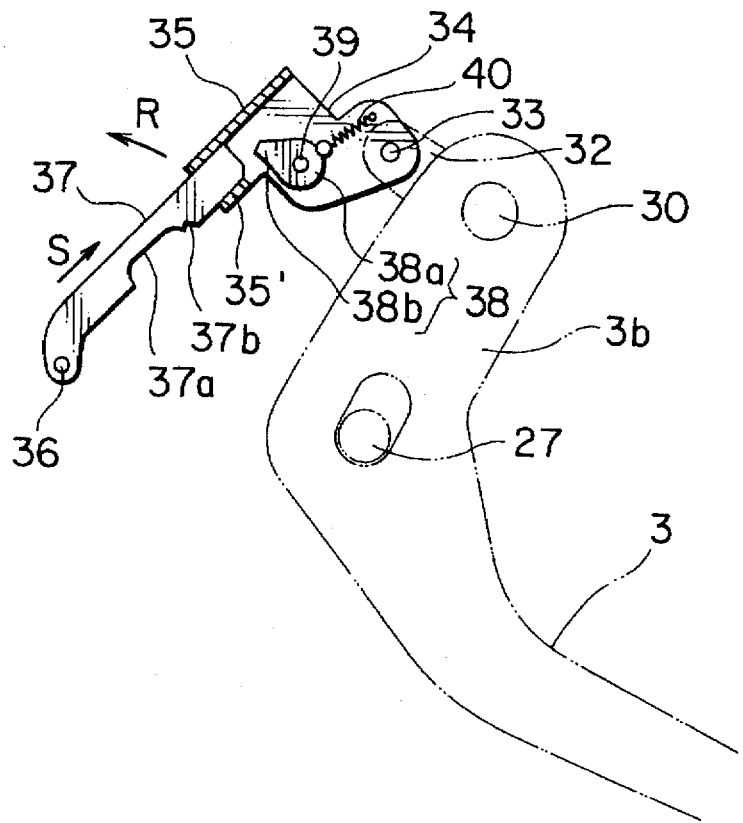
FIGS. 8A and 8B are drawings for explaining a locked state and an unlocked state of a lever 3 shown in FIG. 1.

The locking plate 34 is provided with a pair of opposing guide rails 35 and 35' at an end thereof as illustrated in FIG. 8A. A locking bar 37, rotatably attached to a lower portion of a locking bar portion 18 through a pin 36, is slidably attached to the guide rails 35 and 35'. Inner guide rail 35' is formed shorter than the other guide rail 35, and a notch 37a is formed in the middle of the locking bar 37 on the side of the inner guide rail 35' to provide a relief for a cam. Further, a concave portion 37b is formed on a shoulder at an upper portion of the notch 37a.

Further, a cam 38 is supported by a pin 39 in the middle of and at a lower portion of the locking plate 34, and a tension coil spring 40 is disposed between a round portion 38a of the cam 38 and an intermediate upper portion of the locking plate 34 so that a projection 38b of the cam 38 projects toward a slide path of concave portion 37b of the locking bar 37.

Figure 4:
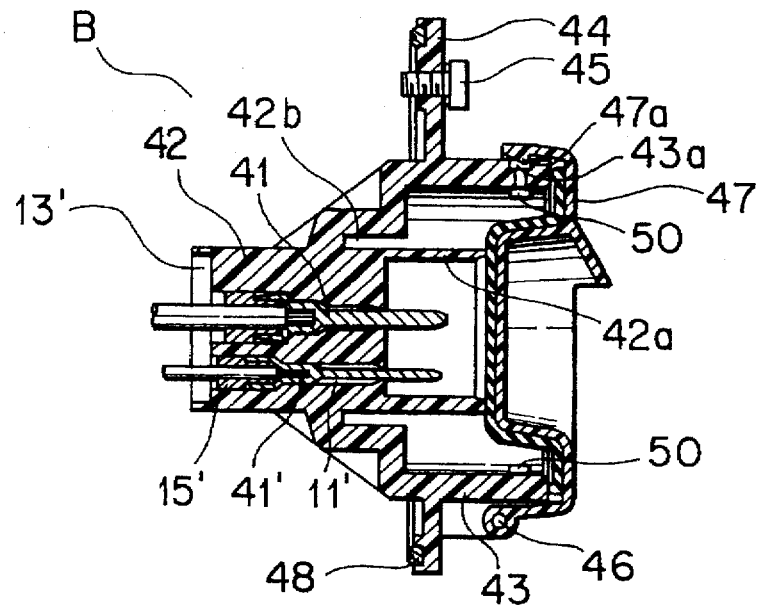
FIG. 4 is a longitudinally cross-sectional view of a receiving connector half B connected to the feeding connector half A in FIG. 1.

A shell 43 is formed on an outer periphery of the connector main body 42, FIG. 4, of the receiving connector half B, in which male terminals are accommodated, so as to extrude outwardly to receive a front portion of a case of the feeding connector half A as illustrated in FIG. 4. The shell 43 is fixed to a vehicle body, not shown, through a flange 44 on an outer periphery of the shell and bolts 45. Further, a cap 47, of which one end is attached to an opening of the shell 43, through a pin 46, is locked by means of the engagement between a locking projection 47a and a locking concave portion 43a on the outer periphery of the shell 43. Reference numeral 11' shows a male terminal accommodating cavities, 13' a rear holder, and 15' a waterproof rubber plug, which shows almost the same construction as the feeding connector half A so that the explanation thereof will be omitted. Numeral 48 shows an O-ring for waterproof sealing.

In the feeding and receiving connector halves A and B, guide channels 49 and 49', FIG. 1, are symmetrically situated on opposite outer sides of a tip of the case 1 to position and lock the connector halves. Rolling pins 50 FIG. 4 are rotatably mounted on an inner face of the shell 43 so as to be engaged with the guide channels 49, FIG. 1. The guide channels 49 consist of an introducing channel 49a extending in the same direction as an axis of the guide channels 49 and a locking channel 49b circumferentially curves from an end of the introducing channel 49a. When the roll pin 50 reaches an end of the locking channel 49b, the both connector halves A and B are preliminarily locked.

In the receiving connector half B, FIG. 4, a hood 42a is formed on a front portion of the connector main body 42 to protect tips of the female terminals 41 and 41', and a guide wall 2a FIG. 3, is located on a front portion of the connector main body of the feeding connector half A to receive the hood 42a. In FIG. 1, reference numeral 51 shows a cap covering the feeding connector half A and machine screws 52 for connecting the split cases 1A and 1B.

In the above embodiment, the explanation was made when the female terminal 12 and the male terminal 41 are accommodated in the feeding connector half A and the receiving connector half B, respectively, but, the connector main bodies 2 and 42 may be designed such that the female terminal 12 is accommodated in the connector half B and the male terminal 41 in the connector half B.

In the construction described above, the case 1 of the feeding connector half A is inserted into the shell of the receiving connector half B by engaging the introducing channels 49a of the guide channels 49 and the rolling pins 50 with each other.

Then, the case 1 is rotated about the connector main body 2 at the locking channel 49b of the case 1, and the locking pin 50 is positioned at an end of the locking channel 49b in FIG. 1 to preliminary lock the both connector halves A and B. Then, the lever 3 is grasped and is rotated in the direction indicated by an arrow P of FIG. 3, which causes the working portion 3b of the lever 3 to be rotated about the pin 27 so that the slider 4a of the handle 4 proceeds in the direction as indicated by an arrow Q. As a result, the connector main body 2 is pushed forwardly in opposition to the resiliency of the compression coil spring 10 through a connector pushing plate 20 so as to be completely connected to the mating connector main body 42 as illustrated in FIG. 6, which causes the connection between the female terminals 12 and 12' and the mail terminals 41 and 41' to be completed.

Figure 8B:
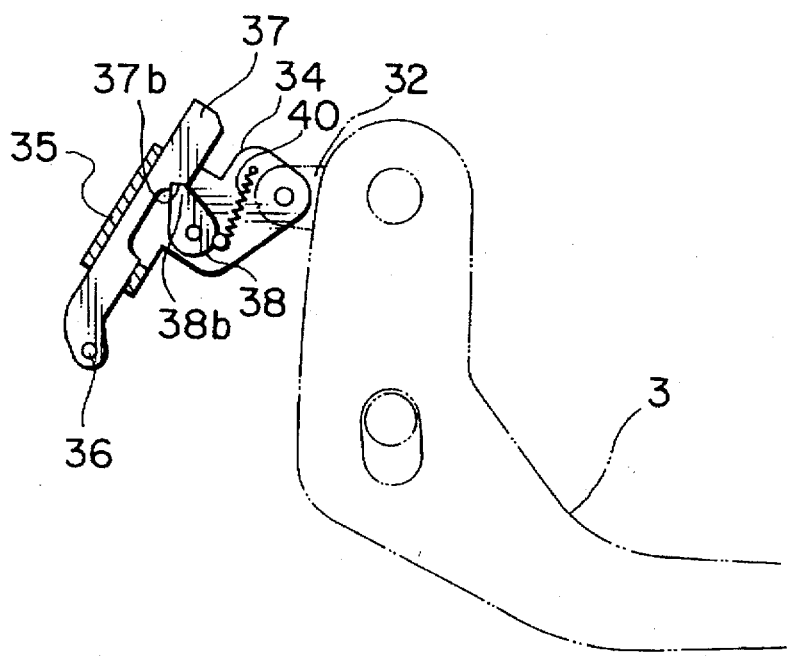
Figure 9:
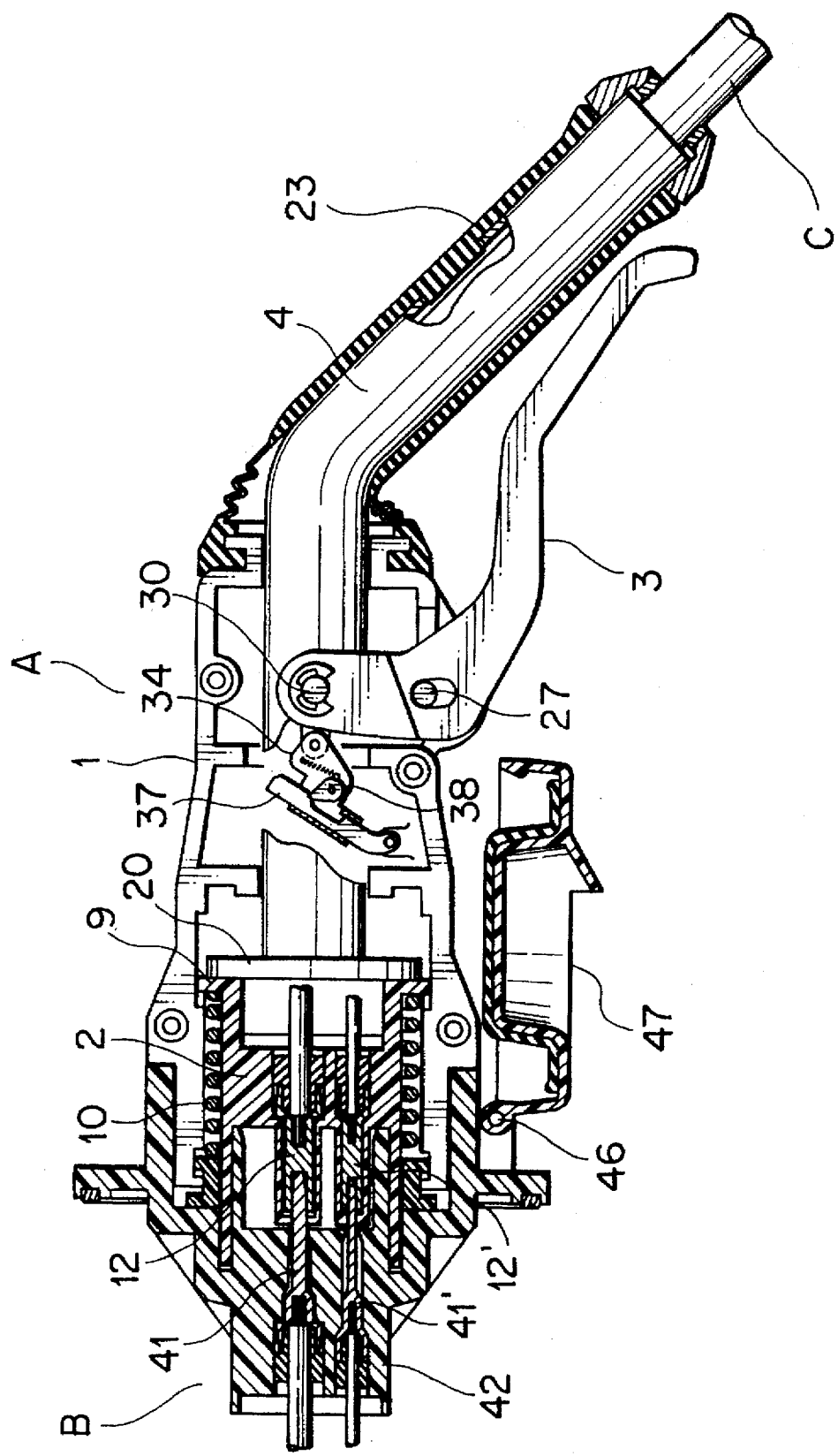
FIG. 9 is a longitudinally cross-sectional view of the feeding and receiving connector halves A and B in a locked state.

As shown in FIGS. 8A and 8B, the rotation of the lever 3 allows the locking plate 34, rotatably attached to an ear piece 32 of the working portion 3b, to move in the same direction as the lever 3 so that the locking bar 37 is guided between the guide rails 35 and 35' and is rotated about the pin 36 in the direction that the locking lever 37 rises as shown by an arrow R. As a result, a projection 38b of the cam 38 slidably contacts a side wall of the locking bar 37 and is rotated in opposition to the tension coil spring 40 to allow the projection 38b to engage with a concave portion 37b and complete locking between the both connector halves A and B or between the connector main bodies 2 and 42.

Under the complete engagement or locking state, the tip of the case of the feeding connector half A is inserted into the shell of the receiving connector half B, and the hood 42a is inserted into the guide wall 2a. A tip of the guide wall 42a is further inserted into a circular concave portion 42b between the hood 42a and the shell 43, which provides a triple waterproof sealing for the connector.

The unlocking or disconnection of the both connector halves A and B is considerably easily carried out as described below. When the lever 3 is further strongly grasped, the engagement between the projection 38b of the cam 38 and the concave portion 37b is released as understood with FIG. 8B and the locking bar 37 rises relatively to the locking plate 34. As a result, the cam 38 is instantly returns to its original state by means of the notch 37a of the locking bar 37 and the tension coil spring 40 to unlock the lever 3. At the same time, the connector main body 2 of the feeding connector half A retreats in the case 1 due to the strong resiliency of the compression coil spring 10 so as to be disconnected from the connector main body 42 of the receiving connector half B.

When the lever 3 is released during the engagement procedure of the both connector halves A and B as described above, the compression coil spring 10 causes the both connector halves to move in the direction that the both connector halves are apart from each ether, which prevents an incomplete locking.

Figure 10:
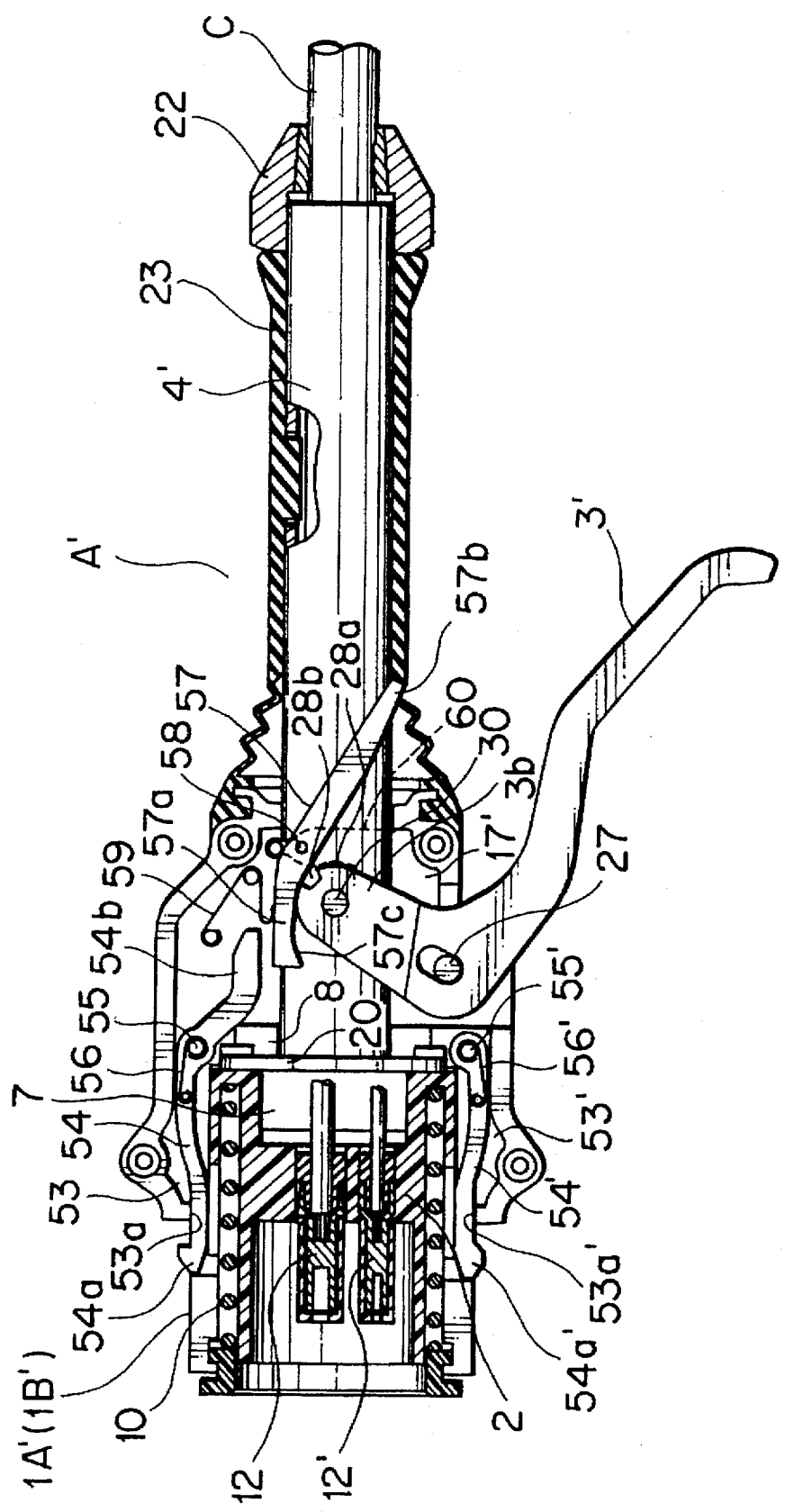
FIG. 10 is a longitudinally cross-sectional view of a feeding connector half A' according to a second embodiment of the present invention.
Figure 11:
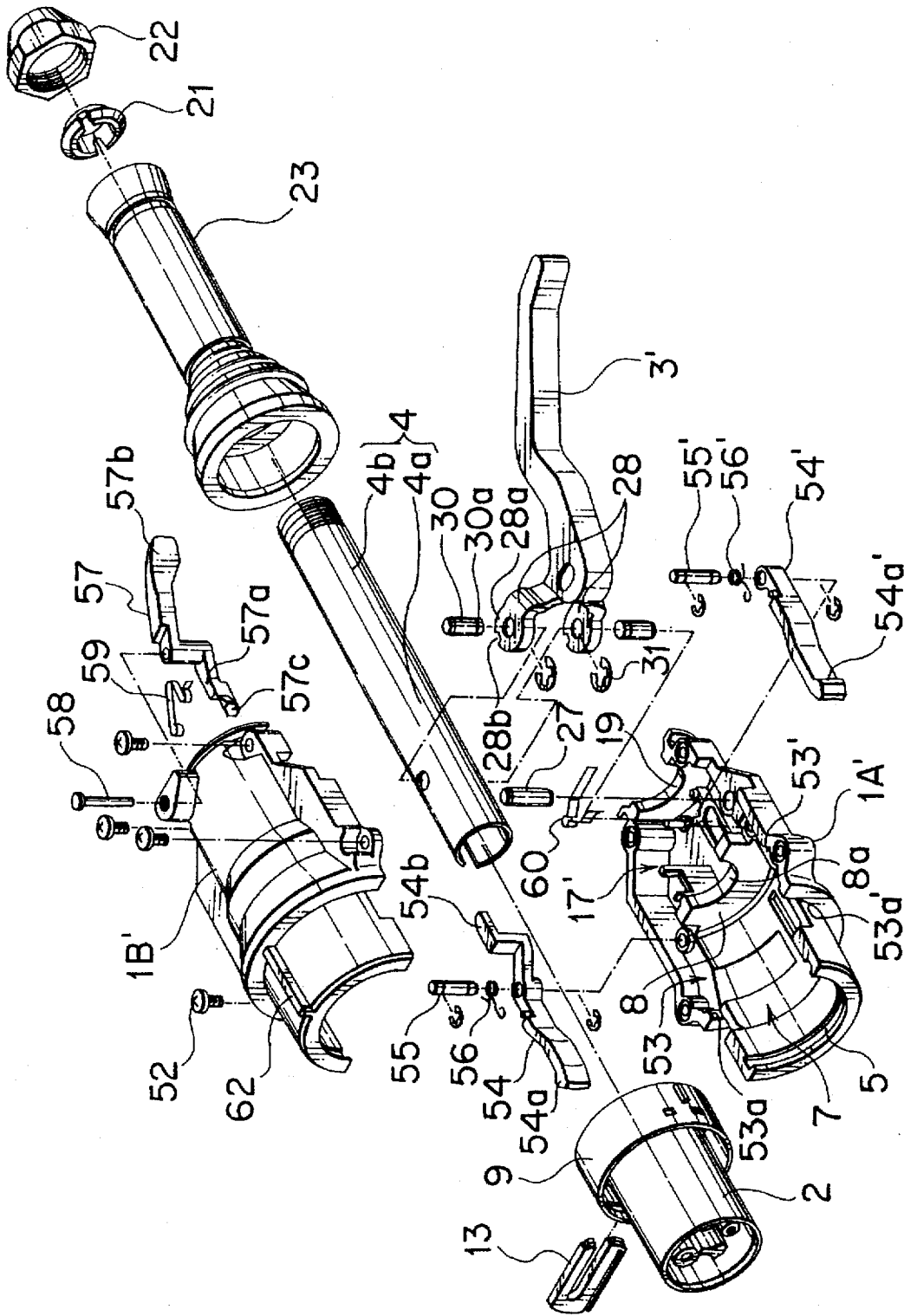
FIG. 11 is an exploded perspective view of a primary portion of the feeding connector half in FIG. 10.
Figure 12:
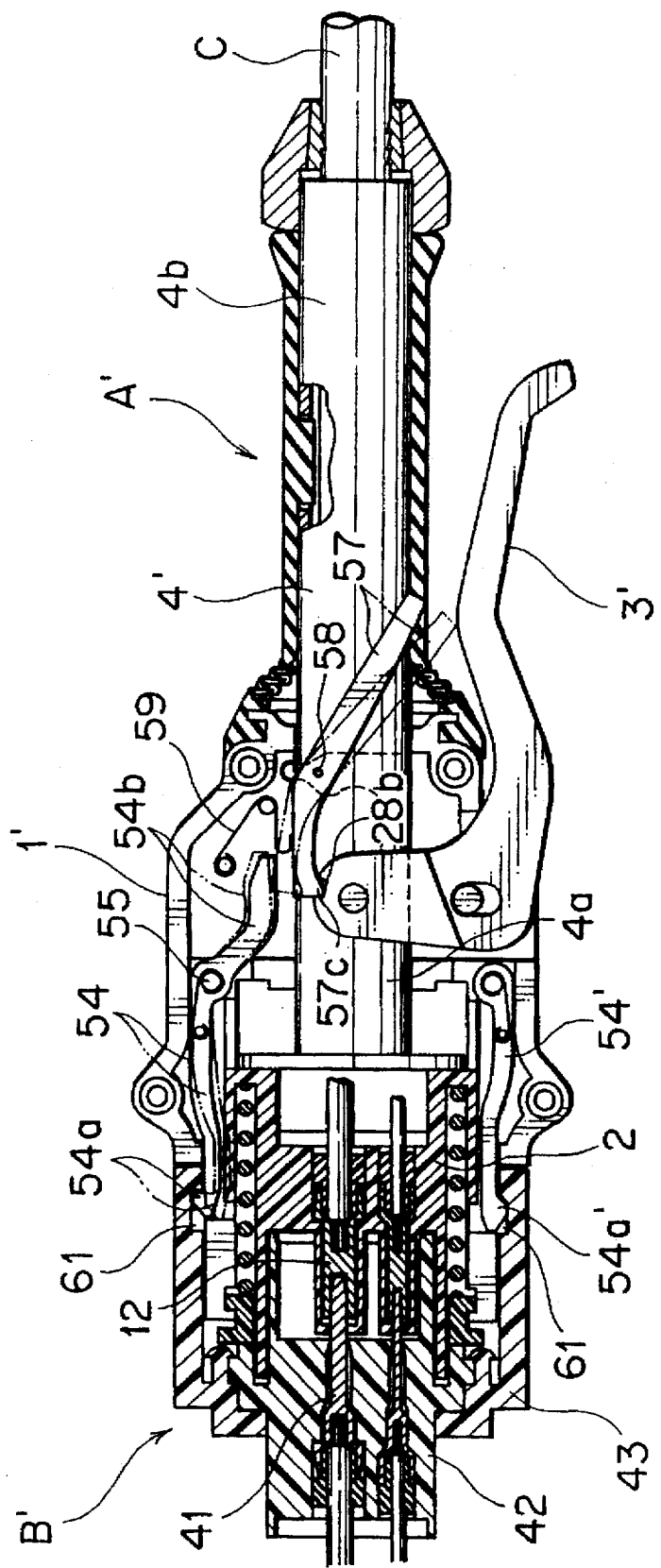
FIG. 12 is a longitudinally cross-sectional view showing the engagement between the feeding and receiving connector halves A' and B' shown in FIG. 10.

FIG. 10 is a cross-sectional view of a feeding connector half according to the second embodiment of the present invention, and FIG. 11 is an exploded perspective view of a primary portion of the feeding connector shown in FIG. 10. FIG. 12 shows a cross section of a locked state with a receiving connector half. In FIGS. 10, 11 and 12, the same reference symbols designate the same elements as the first embodiment, and the explanation thereof will be omitted.

Case 1', FIG. 12, comprising a pair of split cases 1A' and 1B', FIG. 11, is provided with a partition wall 8 at an intermediate portion thereof to divide the case 1' into a connector main body accommodating portion 7 and a lever mounting portion 17'.

A connector main body 2 is slidably mounted to the connector main body accommodating portion 7, and a handle 4' with a main body 4a and a slider 4b, which are integrally formed with each other to form a straight pipe, is slidably supported to a drilled hole 8a of the partition wall 8 and an opening 19 at a rear end portion of the case 1'. Supporting pieces 28 forming a forked portion of the lever 3' which are supported by pins 27 at the lever mounting portion 17' are rotatably attached to the handle 4' like the first embodiment.

Locking chambers 53 and 53' are vertically arranged at the lever mounting portion 17' so as to outwardly expand, and the locking chambers 53a and 53a' are provided with openings 53a and 53a' on the side of the connector main body accommodating portion 7.

References 54 and 54' show locking arms for the receiving connector half B'. One of the locking arms 54 is supported at a meddle thereof by a pin 55 at the locking chamber 53, and an end of the locking arm 54 extends from the opening 53a to an outer periphery of the case 1', and a tip thereof is provided with a hook-shaped locking claw 54a. Further, another end of the locking arm 54 extends on the side of the lever mounting portion 17' side and is formed as a locking piece 54b for a releasing lever 57 describe below. A tip of the other locking arm 54' extends from an opening 53a' toward an outer periphery of the case 17 like the locking arm 54, and a mountain-shaped semi-lock-type locking claw 54a' is formed at the tip of the locking arm 54'. A rear end of the locking arm 54' is supported by a pin 55' at the locking chamber 53'. References 56 and 56' are wire springs for urging the locking arms 53 and 53' outwardly.

Numeral 57 shows a releasing lever of the above locking arm 54 and a middle portion thereof is supported by a pin 58 on the side of the split case 1B', and one of operating portions 57a thereof is situated between the locking piece 54b of the locking arm 54 and one of the supporting pieces 28 of the lever 3. Another operating portion 57b outwardly projects on the rear side of the case 1'. A hook-shaped locking claw 57c downwardly projects from a tip of the operating portion 57a. Further, an end face of the supporting piece 28 is formed as round portion 28a and is provided with a locking concave portion 28b for the locking claw 57c. Numeral 59 shows a plate spring for urging the operating portion 57a of the releasing lever 57 toward the lever 3. That is, toward the round portion 28a of the supporting piece 28. Numeral 60 shows a spring for pushing the operating portion 3b of the lever 60.

Guide projections 62, extending in the direction that the connector halves are engaged with each other, are formed on outer walls of the pair of split cases 1A' and 1B'. The guide projections also work as positioning members.

In the feeding connector half B', on an inner wall of the shell 43, is formed a locking channel 61 engaged with the locking arms 54 and 54' of the receiving connector half A', in place of the rolling pins 50 according to the first embodiment. The feeding connector half B' is further provided with a channel (not shown) which is engaged with the projection 62.

In the second embodiment, the guide projection 62 is engaged with the channel, and the case 1' of the feeding connector half A' is inserted into the shell 43 of the receiving connector half B' to engage a hook-shaped claws 84a and a semi-lock-type locking claw 54a', of locking arms 54 and 54', are engaged with the channels 61, permitting connector halves A' and B' to be locked to each other.

On grasping the lever 3' toward the handle 4', under the conditions described above, the slider 4a proceeds, like the first embodiment, to push the connector main body 2 in the case 1' toward a main body 42 of the mating connector half, causing the slider 4a to be positioned between the locking arms 54 and 54' which are vertically arranged to prevent arms 54 and 54' from inwardly closing. As a result, the feeding connector half A' is more securely locked to the receiving connector half B'. Then, the connection between the female terminals 12 and 12' and the male terminals 41 and 41', as well as the engagement between the connector main bodies 2 and 42, are completed.

In the locking process between connector halves 12 and 42, the rotation of the lever 3' causes the round portion 28a of the supporting piece 28 thereof to slidably contact a lower end of the working portion 57a of the releasing lever 57 urged by the plate spring, which permits the working portion 57a, of the releasing lever 57, to upwardly rotate about the pin 58. Then, the hook-shaped locking claw 57c, at a front end of the operating portion 57a, reaches and engages the locking concave portion 28b, which allows the lever 3 to be locked.

When the both connector halves A' and B' are being unlocked or disconnected from each other, the operating portion 57b of the releasing lever 57, which projects out of the case 1', is depressed first so as to be disconnected from the locking concave potion 28b of the lever 3', causing the connector main body 2 to be disconnected from the mated connector main body 42 by the compression coil spring as in the first embodiment.

After the connector main body 2 retreats, a space is generated between the locking arms 54 and 54'. Further depressing the operation portion 57b of the releasing lever 57 then causes the working portion 57a to raise a locking piece 54b of the locking arm 54 with respect to a pin 55, allowing hook-shaped locking claw 54a, opposing the locking piece 54b, to move downwardly. As a result, the locking channel 61, on an inner wall of the shell, is disconnected from the hook-shaped locking claw 54a. Further, a locking claw 54a', of the other locking arm 54', which is engaged with the other channel 61, is of semi-lock type and the engagement is easily dissolved overcome by drawing the feeding connector A'.

As described above, the engagement, locking, unlocking and disconnection between the connector halves are performed with a series of steps: inserting the feeding connector half A' into the receiving connector half B', preliminarily locking the both connector halves to each other; grasping the lever 3; engaging the releasing lever 57; retreating the connector main body 2; depressing the releasing lever 57 again; dissolving the preliminary locking; and drawing the receiving connector A'.

Even if operator's hand is released from the releasing lever 57, while the lever 3' being unlocked, the round portion 28a of the lever 3', which is rotatably attached to the slider 4a, is in contact with the working portion 57a of the releasing lever 57 so that the handle 4' retreats to lift the locking piece 54b of the locking arm 54, which permits the both connector halves A' and B' to be unlocked from each other.

In the second embodiment, it is unnecessary to slightly rotate the feeding connector half A' about the receiving connector half B', as in the first embodiment, but, it is sufficient to get the both connector halves A' and B' abutted each other or to separate them from each other, resulting in easier locking and unlocking operations.

Figure 13:
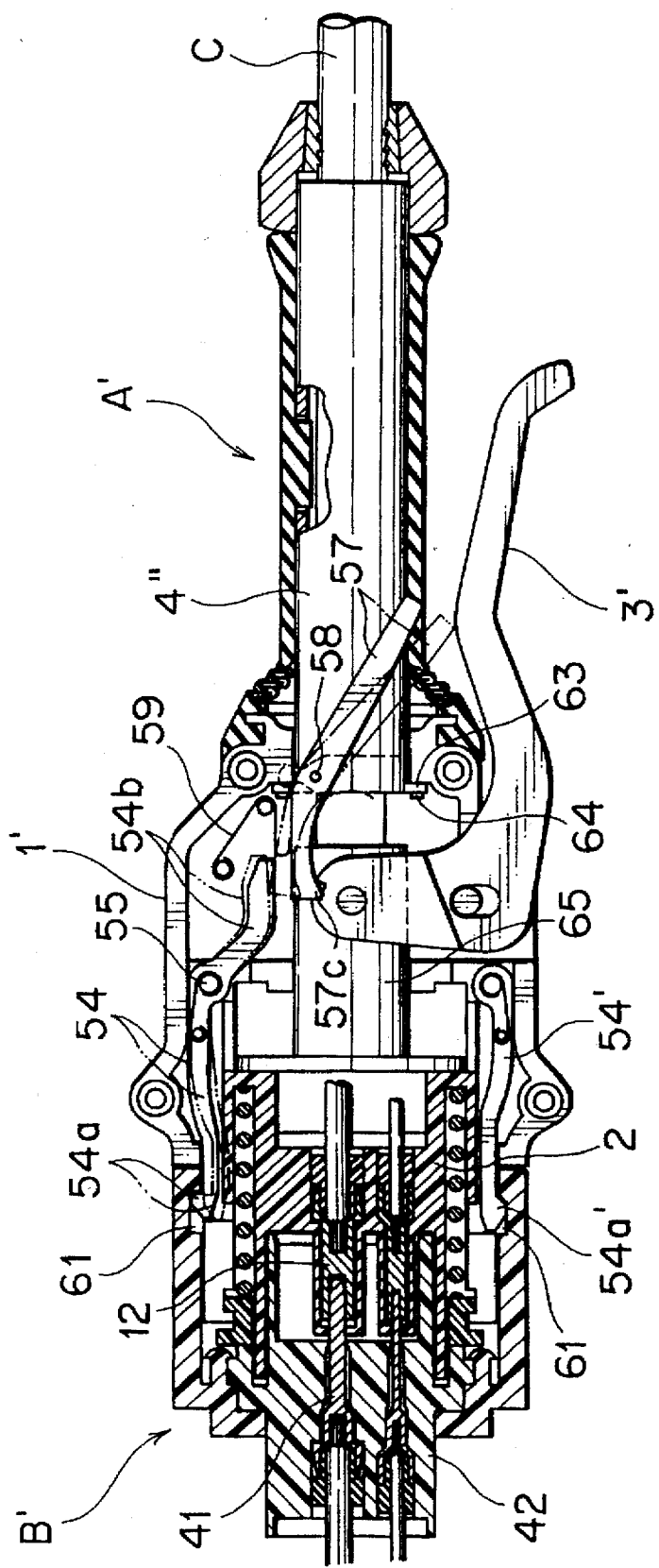
FIG. 13 is a longitudinally cross-sectional view of a feeding connector half A" according to a third embodiment of the present invention.
Figure 14:
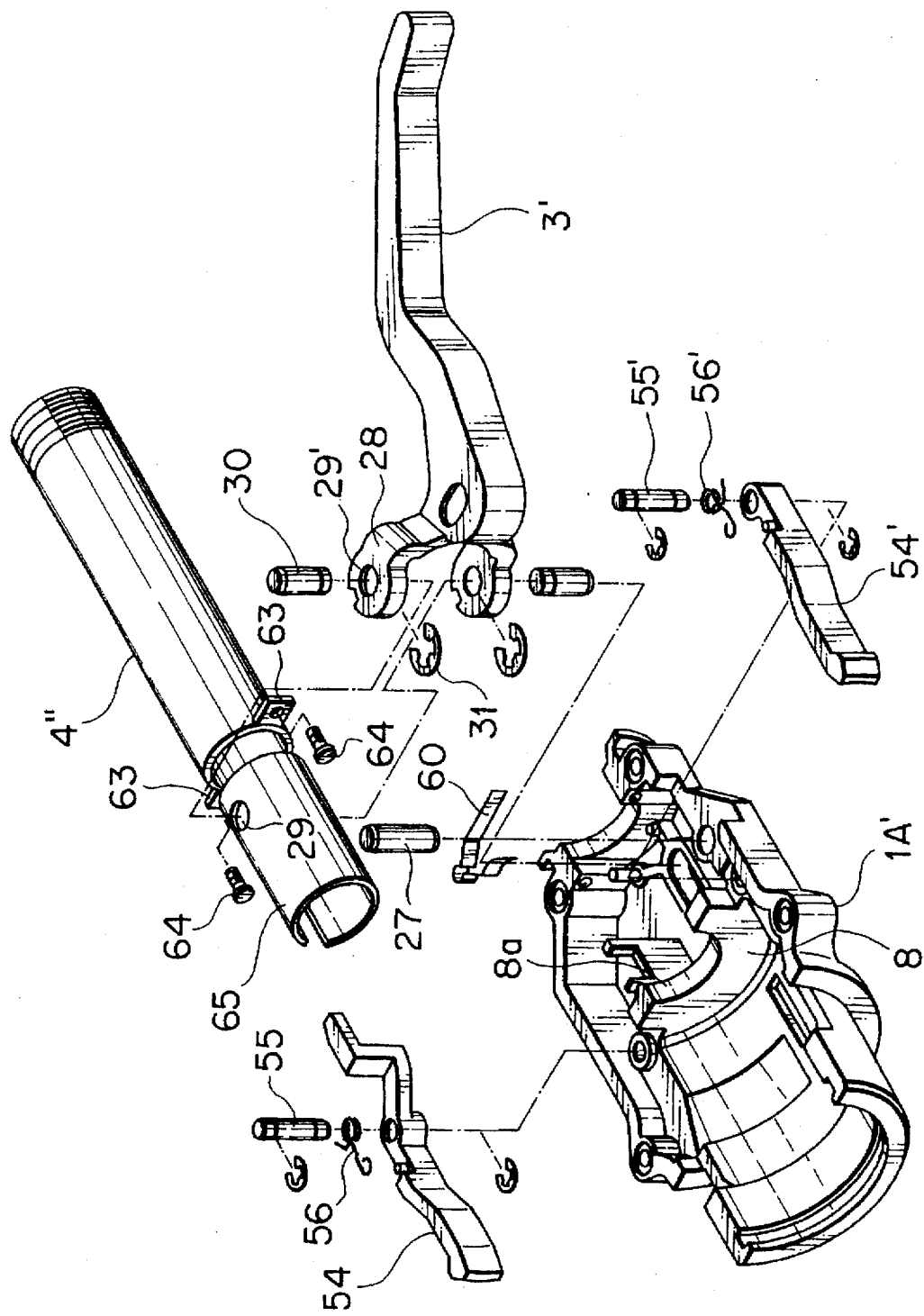
FIG. 14 is an exploded perspective view of a primary portion of the construction shown in FIG. 13.
Figure 15:
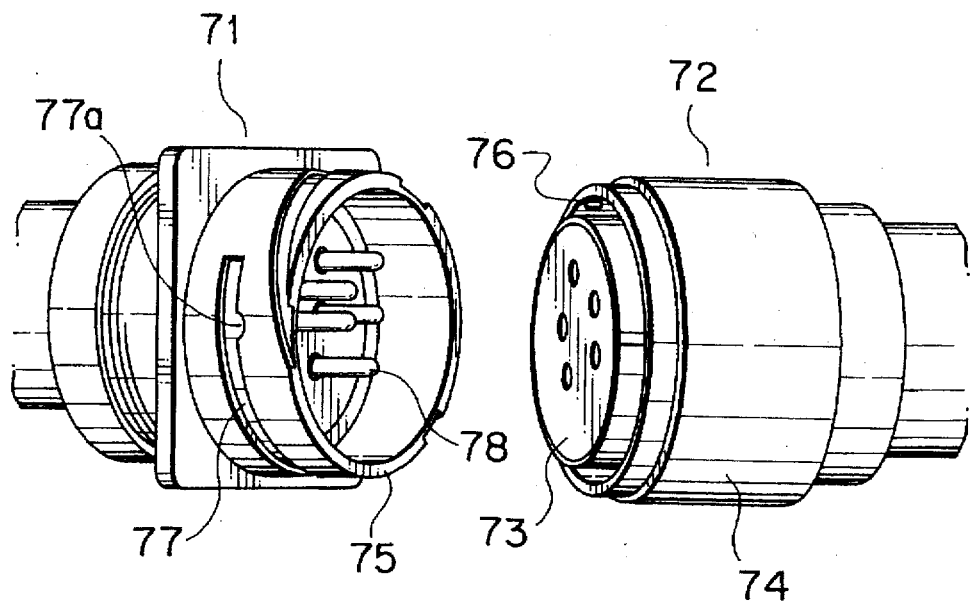
FIG. 15 is a perspective view of a conventional feeding connector in a disconnected state.
Figure 16:
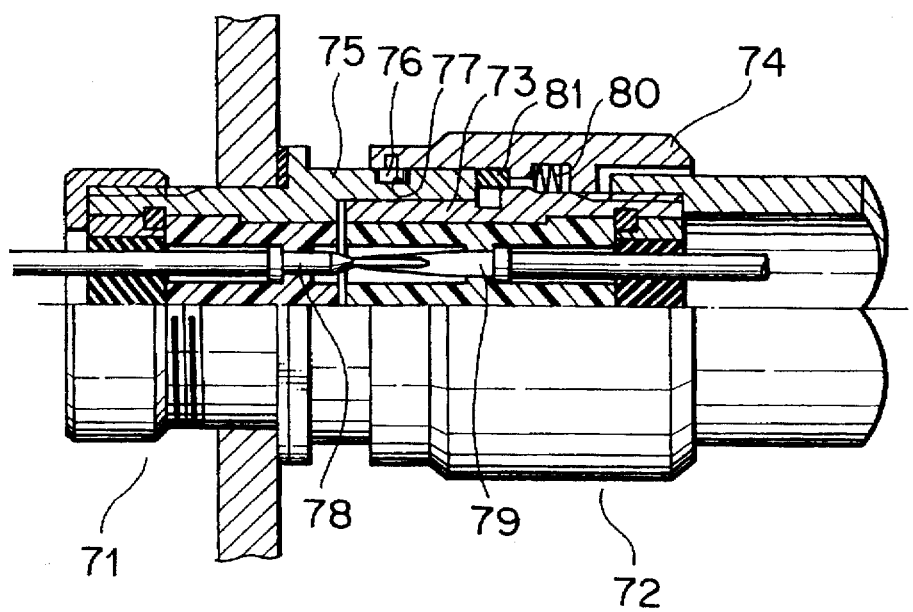
FIG. 16 is a longitudinally cross-sectional view the feeding connector illustrated in FIG. 10 in a connected state.

FIG. 13 is a longitudinally cross-sectional view of the feeding connector half according to the third embodiment of the present invention, and FIG. 14 is an exploded perspective view of a primary portion of the feeding connector half shown in FIG. 13. In this embodiment, the slider 4a for pushing the connector main body illustrated in FIGS. 11 and 12, is formed to be separated from a main body of the handle 4'.

In other words, reference symbol 4" shows a pipe-shaped fixed handle, and 65 a slider. The fixed handle 4" is provided with mounting plates 63 at both ends thereof and is fixed to a reap wall 1a with the opening 19 of the spit case 1A' (1B') by means of a screw 64. A flange engaging the rear wall 1a may be formed in place of the mounting plate 63. The slider 65 has a shape of a pipe with the same diameter as the fixed handle 4" and a tip thereof is inserted into and supported by a drilled hole 8a of a partition wall 8. A lever 3' is attached to a rear portion of the slider 65.

The construction of the slider 65, lever 3, releasing lever 57 and the like are the same as the second embodiment and the explanation thereof will be omitted.

In the first and second embodiment of the present invention, the rotation of the lever 3 or 3' causes the handle 4 and all to slide, that is, the slider 4a and the main body 4b simultaneously slide. However, in these embodiment, there is a fear that the connector main body 2 does not slide smoothly because the cable C is drawn into the main body 4b, as described above.

In the third embodiment, the rotation of the lever 3' permits the slider 65 to slide regardless of the handle 4", which provides smoother engagement between the connector main body 2 and the mating connector half.

It is possible to apply the separate construction of the slider 65 and the fixed handle 4" in the third embodiment to the lever 3 and the handle 4 in the same manner as the first embodiment. The slider 65 may be integrally formed with the connector pushing plate 20 or the connector main body 2 which are illustrated in FIGS. 1 and 10. As described above, with the construction according to the present invention, not only the incomplete connection between the feeding and receiving connector halves is prevented but also the locking, or unlocking, between the both connector halves is carried out with one-touch operation.

What is claimed is:

1. An electrical connector comprising a feeding connector half and a receiving connector half, wherein said feeding connector half comprises:

a case;

a connector main body slidably accommodated in a front half portion of the case for accommodating a plurality of terminals;

a handle attached to a rear half portion of the case;

a slider on said handle for causing the connector main body in the case to slide;

a lever rotatably supported in said case at an intermediate portion of said lever, a working portion at one end of said lever rotatably attached to the handle and an operating portion at the opposite end of said lever projecting out of the case;

a locking means for locking the lever at a position where the connector main body of said feeding connector is locked to a connector main body of the receiving connector half by rotation of the rotatable lever; and a means for unlocking the lever.

2. An electrical connector as claimed in claim 1, further comprising a preliminary locking means for locking the feeding connector half and the receiving connector half.

3. An electrical connector as claimed in claim 1, wherein said handle has a shape of a pipe, and an electrical cable positioned in said pipe and having leads for connection to a plurality of terminals.

4. An electrical connector as claimed in claim 1, wherein said slider is mounted in a rear half section of said case and is coaxially slidable with said connector main body of said feeding connector half so that said feeding connector half is engaged with said receiving connector half.

5. An electrical connector as claimed in claim 1, further comprising a means in said case for urging the connector main body of the feeding connector half toward the handle.

6. An electrical connector as claimed in claim 1, wherein said slider is integral with the handle.

* * * * *